US006099157A

United States Patent [19]

Waescher

[11] Patent Number: 6,099,157

[45] Date of Patent: Aug. 8, 2000

[54] VEHICLE HEADLIGHT

[75] Inventor: Arnulf Waescher, Werl, Germany

[73] Assignee: Hella KG Hueck & Co., Lippstadt, Germany

[21] Appl. No.: 09/301,462

[22] Filed: Apr. 29, 1999

Related U.S. Application Data

[62] Division of application No. PCT/EP98/05552, Sep. 2, 1998.

[30] Foreign Application Priority Data

Sep. 5, 1997 [DE] Germany ........................... 197 38 831

[51] Int. Cl.$^7$ ........................................................ B60Q 1/00

[52] U.S. Cl. .......................... 362/512; 362/538; 362/539; 362/296

[58] Field of Search .................................... 362/538, 539, 362/507, 509, 512, 514, 296

[56] References Cited

U.S. PATENT DOCUMENTS

| | | | |
|---|---|---|---|
| 1,834,542 | 12/1931 | Karlebo | 362/538 |
| 4,636,923 | 1/1987 | Oyama et al. | 362/80 |
| 4,677,532 | 6/1987 | Peitz et al. | 362/61 |
| 4,814,950 | 3/1989 | Nakata | 362/61 |
| 4,922,386 | 5/1990 | Bockeler et al. | 362/61 |
| 5,113,330 | 5/1992 | Makita | 362/265 |
| 5,188,444 | 2/1993 | Makita et al. | 362/80 |
| 5,465,195 | 11/1995 | Jenner et al. | 362/61 |
| 5,567,035 | 10/1996 | Dobbler et al. | 362/66 |
| 5,613,754 | 3/1997 | Dobbler et al. | 362/66 |

FOREIGN PATENT DOCUMENTS

| | | |
|---|---|---|
| 0 200 928 A2 | 11/1986 | European Pat. Off. . |
| 0 212 211 A2 | 3/1987 | European Pat. Off. . |
| 0 355 529 A2 | 2/1990 | European Pat. Off. . |
| 2 687 760 A1 | 8/1993 | France . |
| 35 35 249 A1 | 4/1986 | Germany . |
| 41 20 070 A1 | 1/1992 | Germany . |
| 41 20 786 C2 | 1/1992 | Germany . |

*Primary Examiner*—Sandra O'Shea
*Assistant Examiner*—John A. Ward
*Attorney, Agent, or Firm*—Birch, Stewart, Kolasch & Birch, LLP

[57] ABSTRACT

A vehicle headlight comprises a light source positioned at a focal area of a reflector. A lens is positioned in front of the reflector, and a screen is placed between the reflector and the lens. The screen is formed as an elastic bowed part having a bowed edge for creating a light-dark border of a light pattern, and is connected and held at its free ends to a frame by latch elements engaging into latch openings.

10 Claims, 2 Drawing Sheets

VEHICLE HEADLIGHT

This application is a Continuation of International Application Number PCT/EP98/05552 filed Sept. 2, 1998, still pending.

BACKGROUND OF THE INVENTION

This invention relates to a vehicle headlight comprising a reflector, a light source positioned at a focal area of the reflector, a lens positioned in front of the reflector, a sheet-metal screen placed between the reflector and the lens whose edge creates a light-dark border of a light pattern, and a frame that supports the lens and the screen.

European patent document (EP 0 200 928 A2) discloses a vehicle headlight of this type. A light unit of this headlight comprises an ellipsoidal reflector, a light source positioned inside the reflector, and a frame, placed in front of the reflector and attached to an outer circumferential edge of the reflector, which supports a lens and a screen placed between the lens and the reflector. An incandescent or gas discharge lamp may be used as the light source. The frame is manufactured from deep-drawn sheet steel. Deep-drawn sheet steel can be plastically shaped quite readily, and therefore exhibits very little elasticity. The frame has a support ring, formed during the deep drawing process, into which the lens and a snap ring that fastens the lens in the support ring are inserted from a front of the light unit. Support legs that are fastened on the outer edge of the reflector are formed as a single unit with the support ring. The screen is formed as a single unit with the support ring via an arm-like mounting element that is positioned between two support legs of the frame. The screen is pivoted toward the lens about a pivot formed at a bending area of the arm-like mounting element. The screen is plate-shaped and extends in a plane that is transverse to a direction in which light exits. An edge of the screen extending in the plane is located at a focal area of the lens and creates a light-dark border of a light pattern of the light system.

One section of a screen-edge portion extends horizontally, while another section runs diagonally down from the optical axis. In this way, an asymmetrical light distribution occurs on a roadway. The screen extending in a plane has free end sections at its lateral free ends bent toward the lens, which can be attached to the respective adjacent support legs by laser welding. The screen can also be attached to the support legs via soldering, rivets, or screws. An automatic engaging, or snapping, of the screen to the support legs is impossible owing to insufficient elasticity of deep-drawn sheet steel. In order to maintain a sufficiently long spring excursion at locking locations, the end sections of the screen, that are to be locked onto the support legs, would have to be very long. However, a spring force would be very small and therefore a secure locking of the screen to the frame would not be assured.

In a vehicle headlight disclosed in European patent document (EP 0 212 211 B1), a light system serves to provide fog light. Such light systems are much smaller than light system that generate asymmetrical light, and, because of their small construction, they comprise at most one screen that has a bowed or curved, screen-edge portion. The bowed screen-edge portion is formed by a screen that is a cylindrical wall section. The lens and the screen are inserted, from a reflector side, into a a frame connected to the reflector, and fastened to a support ring of the frame. In a headlight known in the art, the bowed screen is manufactured by zinc die casting, and has riveting pins formed on it with which the screen can be affixed to the frame. Such screens are expensive to manufacture, and installing them is complicated and time-consuming.

An object of this invention is to provide a vehicle headlight of a type including a reflector, a light source positioned at a focal area of the reflector, a lens positioned in front of the reflector, a sheet-metal screen placed between the reflector and the lens an edge of which creates a light-dark border of a light pattern, and a frame that supports the lens and the screen, structured so that the screen can be fastened to the frame automatically and with considerable retention force without requiring the use of an additional fastening elements.

SUMMARY OF THE INVENTION

According to principles of the invention a screen and its edge are bowed, or curved, and form an elastic bowed, or curved, part that is connected and held at its free ends to a frame by latch elements engaging in latch openings. Because of its bowed shape, the screen itself is an expanding spring that can be inserted into the frame simply and easily. A screen edge does not require adjustment with respect to the lens, as is necessary for the headlights disclosed in European patent document (EP 0 200 928 A2) and German patent document (DE 35 35 249 A 1), since there is an accurate spacing between the screen-edge portion the lens once the screen is latched onto the frame.

BRIEF DESCRIPTION OF THE DRAWING

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
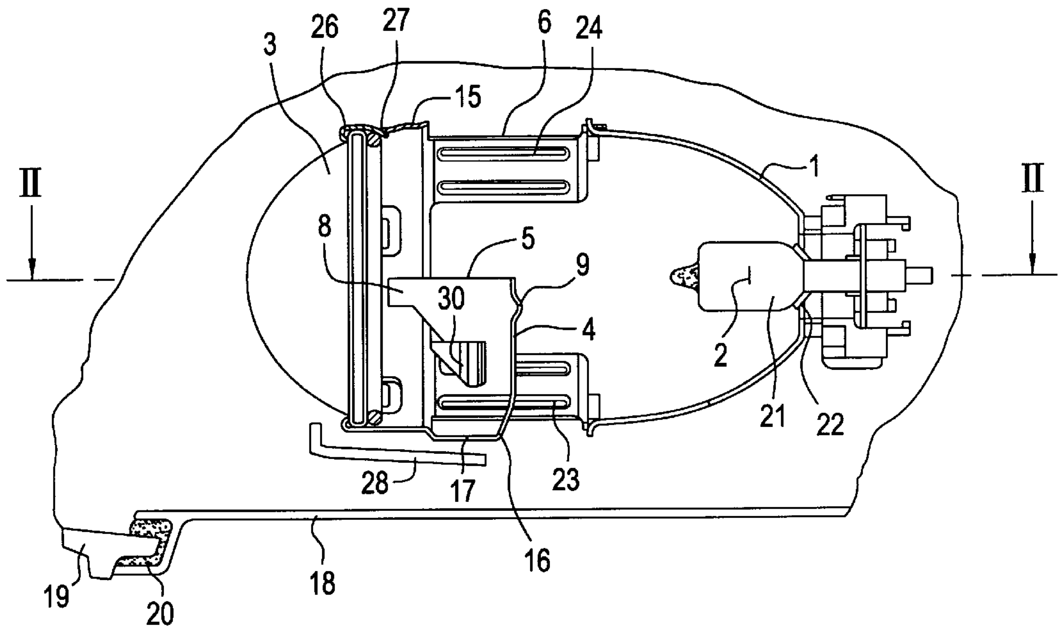
FIG. 1 is a segmented cross-sectional view of a vertical central section through a light unit of a vehicle headlight of this invention that has a frame supporting a screen and a lens.
Figure 2:
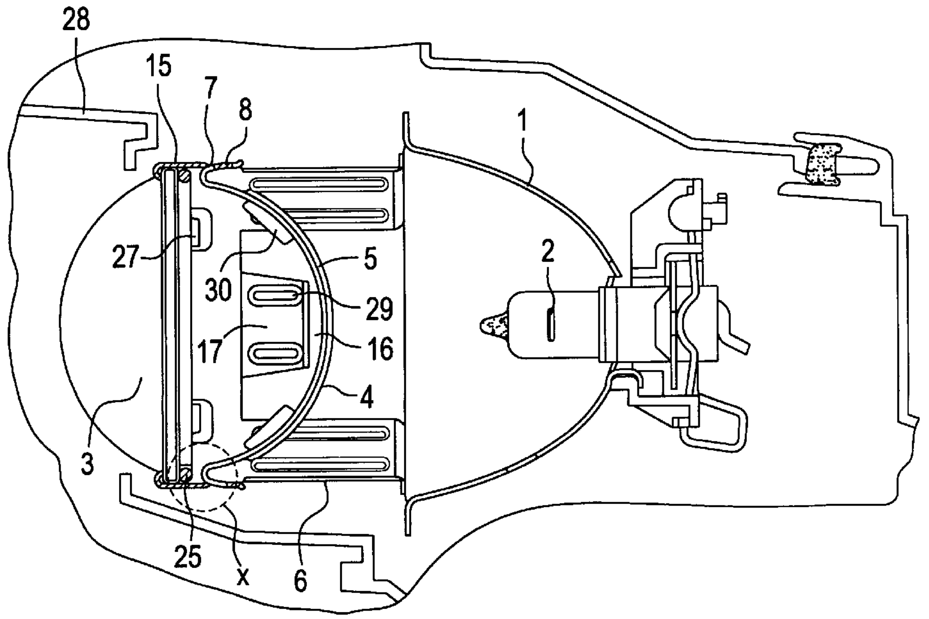
FIG. 2 is a sectional view taken on line II—II in FIG. 1.

A vehicle headlight has a bowl-shaped housing 18 and a light transmissive cover plate 19 that covers a front end of the bowl-shaped housing. An outer circumferential edge of the cover plate 19 is inserted into a receiving bed 20 of the housing 18 and is glued to the housing 18 in the receiving bed 20. A light system for fog light and a light system (not illustrated) for high beam and asymmetrical low beam light is mounted in the bowl-shaped housing 18. The light system for fog light is formed by the light unit shown in FIGS. 1 and 2, which is significantly smaller than is a light system for asymmetrical low beam light.

The light unit for a fog light comprises an ellipsoidal reflector 1 having a light source 2 located at its inner focus. The light source 2 is formed by a lamp 21 which is inserted, glass bulb first, through an opening 22 at a vertex of the reflector 1.

Support legs 23 of a frame 6, manufactured of deep-drawn sheet steel, are fastened to a front circumferential edge of the reflector 1. The support legs 23 have reinforcing grooves running longitudinally thereof, and are connected as a single piece with a support ring 15 of the frame 6, which supports a lens 3. The lens 3 and a spring, or snap, ring 25, holding the lens 3 in the support ring 15, are inserted from the reflector side into the support ring 15.

A circumferential outer flange of the lens 3 lies adjacent a front edge 26 of the support ring 15, with the snap ring 25 being adjacent an inside of the lens 3, supported on inward-facing retaining tabs 27 of the support ring 15. A convex front of the lens 3 extends into an opening of the cover 28.

A screen 4 is structured as a single piece with the support ring 15 of the frame 6, via an arm-like mounting element 17. The mounting element 17 is located below an optical axis of the light unit between two support legs 23 of the frame 6. Two reinforcing grooves 29 are pressed in the arm-like mounting element 17. The screen is structured from a cylindrical section of sheet steel with very little elasticity, and is, because of its large dimensions, a spring bow. It is sufficient for the elastic bow to have a spring excursion at each free end which corresponds approximately to a wall thickness of the screen 4. The screen 4 has a screen-edge portion 5 that extends in a horizontal plane and it tapers inwardly towards its free ends. The free ends of the screen 4 are bent toward the outer edge of the reflector 1 and serve as latching elements 8. The latching elements 8 border the plane in which the screen-edge portion 5 of the screen 4 extends and engage in rectangular latch openings 7 of the support ring 15. The latch openings 7 are stamped out of the support ring 15 and each has a narrow inner edge 13 directed toward the lens 3, which serve as stops for the latch elements 8. Horizontal narrow inner edges 14 of the latch opening 7 are adjacent to the latch elements 8 and hold the latch elements 8 in a vertical position. When the latch elements 8 are latched into the latch openings 7, outer surfaces of rounded bending areas 10 of the latch elements 8 glide along inner edges 11 of the latch openings 7 which face the reflector 1, until narrow end edges 12 of the latch elements 8, that are directed toward the reflector, springingly abut against the narrow inner edges 13 of the latch openings 7 directed toward the lens 3, owing to an elastic restoring force of the mounting element 17.

Figure 3:
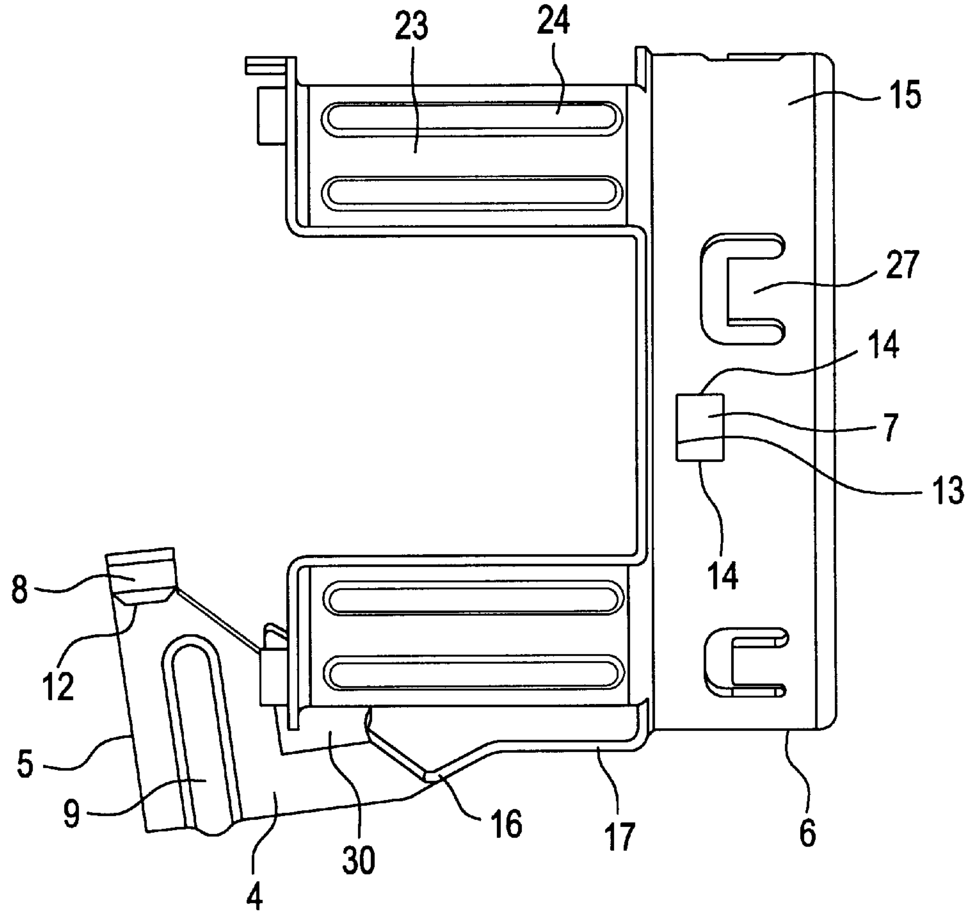
FIG. 3 is a lateral view of the frame for supporting the lens shown as a single piece, wherein the screen is not yet latched to a support ring of the frame that supports the lens.
Figure 4:
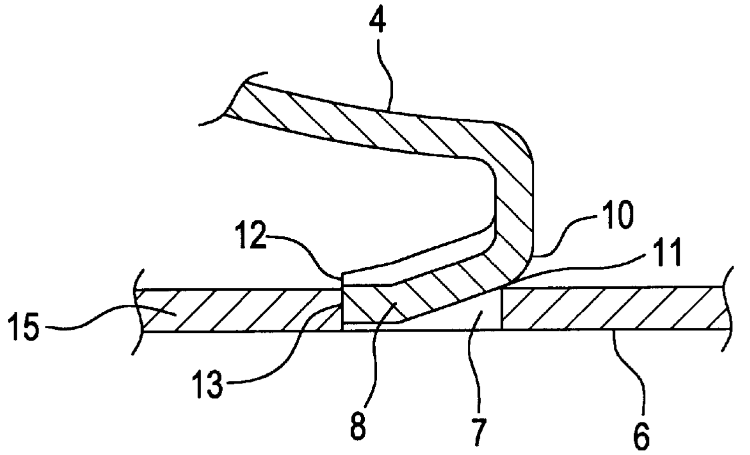
FIG. 4 is an enlarged, segmented, cross-sectional view of a latching location between the screen and the support ring.

The arm-like mounting element 17 of the screen 4 has a bending area serving as a pivot 16 about which the screen 4 is pivoted toward the lens. Once the latch elements 8 of the screen 4 automatically latch into the latch openings 7 of the support ring 15 of the frame 6, the screen-edge portion 5 is spaced accurately from the lens 3 and lies at a focus area of the lens 3. A sharp outline of a dark-light border of a light pattern is provided in this manner. So that the latch elements 8 are supported with a very great spring force on the edges 11 of the latch openings 7 of the support ring 15, a reinforcing groove 9 is pressed into the bowed screen 4, which extends lengthwise, horizontally, between the latch elements 8 near the screen-edge portion 5. In the frame 6 illustrated in FIG. 3, the screen 4 has not yet been pivoted into the receiving opening formed by the support ring for the lens 3, relative to the direction of the optical axis. In this way, the lens 3 can be inserted into the support ring 15 from the side of the frame 6 facing the reflector 1. Through a subsequent automatic latching of the screen 4 to the support ring 15, damage to the lens 3 is prevented. In order to be able to pivot the screen 4 past free ends of the support leg 23, bent out areas 30 are provided in an edge of the screen 4 that faces toward the lens 3.

Because the screen itself is the bracing, or expanding, spring due to its bowed shape, it still exhibits a sufficiently large spring excursion at the free end sections latched to the frame even when it is made from a sheet metal that possesses very little elasticity. This is quite advantageous if the screen, as in the vehicle headlight disclosed in the European patent document (EP 0 200 928 A2), is manufactured from deep-drawn sheet steel as a single piece with the frame. Deep-drawn sheet steel can be plastically shaped quite readily and therefore exhibits very little elasticity. Moreover, screens manufactured from sheet steel that can be plastically shaped quite readily can be structured with walls of sufficient thickness that a high heat occurring at the screen-edge portion is effectively dissipated away via the screen and the frame.

The elasticity of the screen, which exhibits considerable dimensional stability, increases at the free ends that are automatically latched to the frame if the bowed screen tapers towards its free ends. The dimensional stability of the screen and its spring force at its free ends increases if the bowed screen has at least one indented reinforcing groove that extends toward the free ends.

The curve formed by the screen is structured to be as long as possible and the free ends of the screen that are latched to the frame are positioned as far apart from each other as possible if the free ends of the bowed screen lie adjacent to a plane in which the screen-edge portion extends. In this manner, very considerable spring force and considerable spring excursion are provided for the free ends of the screen.

During installation, this screen can be easily and quickly latched to the frame from the reflector side, without catching on the frame, if the latch elements are formed by free ends of the bowed screen bent toward the reflector. Premature interlocking, or catching, of the bowed screen during installation is impossible, since the latch elements have a bent area directed toward the lens that slides along the frame until the latch elements of the screen are automatically engaged in the latch openings of the frame. After the screen is latched to the frame, the screen-edge portion is spaced quite accurately from the lens by having the rounded bent areas of the bent latch elements of the screen positioned elastically adjacent inner edges of the latch openings of the frame directed toward the reflector, and by having their narrow end surfaces directed toward the reflector abut against the narrow inner edge surfaces of the latch opening directed toward the lens. When the latch elements latch into the latch openings, bent areas of the latch elements slide along the inner edges, facing toward the reflector, of the latch openings until the narrow end surfaces of the latch elements directed toward the reflector abut the narrow inner edge surfaces of the latch opening directed toward the lens. Vertically, the screen is affixed accurately in position on the frame when the latch elements engage so that there is no play between narrower inner edge surfaces of the latch opening extending in the direction in which the light exits. A small amount of play is necessary, since otherwise automatic latching of the latch elements in the latch opening is not possible.

A structural depth of the light unit comprising the reflector, the lens, the screen, and the frame is very small if the latch elements engaging in the latch openings exist between the free ends of the bowed screen and a support ring of the frame that holds the lens. In addition, the screen can exert very considerable spring force on the frame without creating a plastic deformation of the frame at the latching locations.

The screen is easy to mount if a pivot exists between the bowed screen and the frame, about which the screen is pivoted toward the lens until it latches with the frame. The pivot can be formed by a lug-type connector located between the screen and the frame. Moreover, a third support point between the screen and the frame is provided by the pivot, in addition to the latching locations. The edge of the screen is also spaced very accurately from the lens, even with a clearance fit between the latch elements and the latch openings, by forming the pivot as a bending area of the mounting element connecting the bowed screen with the support ring as a single piece, thereby providing spring back of the angled screen toward the reflector and an elastic close fit of the latch elements to inner edge surfaces of the latch openings. The spring back of the angled screen is provided since an elastic restoring force exists after the bowed screen is bent toward the lens.

The invention claimed is:

1. A vehicle headlight comprising a reflector, a light source positioned at a focal area of the reflector, a lens positioned in front of the reflector, a sheet-metal screen placed between the reflector and the lens, said screen having a bowed screen edge creating a light-dark border of a light pattern, and a frame that supports the lens and the screen, with the screen forming an elastic bowed spring having free ends which springly move to self latch to, and be held to, the frame by latch elements which engage in latch openings.

2. A vehicle headlight as in claim 1, wherein the bowed screen tapers toward its free ends.

3. A vehicle headlight as in claim 1, wherein the bowed screen has at least one indented reinforcing groove that extends toward the free ends of the bowed screen.

4. A vehicle headlight as in claim 1, wherein the latch elements are at the free ends of the bowed screen and are adjacent to a plane in which the screen edge extends.

5. A vehicle headlight as in claim 1, wherein the latch elements are at the free ends and are formed by the free ends of the bowed screen being bent toward the reflector to form the latch elements as bent latch elements, and the latch openings are in the frame.

6. A vehicle headlight as in claim 5, wherein rounded bent areas of the bent latch elements of the screen are elastically urged toward inner edges of the latch openings of the frame directed toward the reflector, and narrow end edges of the bent latch elements of the screen, facing toward the reflector, abut against narrow inner edges of the latch openings facing toward the lens.

7. A vehicle headlight as in claim 1, wherein the latch elements are adjacent narrow lateral surfaces of the latch openings elongated in a direction in which light exits.

8. A vehicle headlight as in claim 1, wherein one of the latch elements and the latch openings are on a support ring of the frame that supports the lens.

9. A vehicle headlight as in claim 1, wherein the bowed screen is also linked to the frame by a pivot located between the bowed screen and the frame, about which the screen is pivoted toward the lens until the latch elements and latch openings latch the screen to the frame.

10. A vehicle headlight as in claim 9, wherein the pivot is formed by a bending area of a mounting element connecting the bowed screen with the support ring as a single piece, thereby providing spring back of the screen toward the reflector and an elastically close fit of the latch elements to inner edge surfaces of the latch openings.

* * * * *